United States Patent [19]

Kriegler et al.

[11] Patent Number: 5,492,189
[45] Date of Patent: Feb. 20, 1996

[54] HYBRID DRIVE SYSTEM

[75] Inventors: Wolfgang Kriegler, St. Paul i. Lavanttal; Michael Rasser; Erwin Reisinger, both of Graz, all of Austria

[73] Assignee: AVL Gesellschaft für Verbrennungskraftmaschinen und Messtechnik m.b.H. Prof. Dr. Dr.h.c. Hans List, Graz, Austria

[21] Appl. No.: 347,101

[22] Filed: Nov. 22, 1994

Related U.S. Application Data

[63] Continuation of Ser. No. 4,300, Jan. 14, 1993, abandoned.

[30] Foreign Application Priority Data

Jan. 16, 1992 [AU] Australia ................... A61/92

[51] Int. Cl.⁶ ..................................... B60K 6/04
[52] U.S. Cl. ............... 180/65.2; 180/65.6; 477/2
[58] Field of Search .................. 180/65.2, 65.3, 180/65.6, 65.7, 65.8, 165; 318/139; 123/DIG. 8; 477/2, 3

[56] References Cited

U.S. PATENT DOCUMENTS

| | | | |
|---|---|---|---|
| 3,799,284 | 3/1974 | Hender | 180/65.2 |
| 3,861,484 | 1/1975 | Joslin | 180/65.2 |
| 3,923,115 | 12/1975 | Helling . | |
| 4,099,589 | 7/1978 | Williams | 180/65.2 |
| 4,335,429 | 6/1982 | Kawakatsu . | |
| 4,400,997 | 8/1983 | Fiala | 180/65.2 X |
| 4,502,558 | 3/1985 | Mauri | 180/65.2 X |
| 4,533,011 | 8/1985 | Heidemeyer et al. | 180/65.2 |
| 5,103,923 | 4/1992 | Johnston et al. | 180/65.2 |
| 5,117,931 | 6/1992 | Nishida | 180/65.2 |
| 5,195,600 | 3/1993 | Dorgan | 180/65.2 X |

FOREIGN PATENT DOCUMENTS

| | | | |
|---|---|---|---|
| 0447510 | 8/1993 | European Pat. Off. . | |
| 2419832 | 11/1979 | France | 180/65.2 |
| 2353724 | 11/1975 | Germany . | |
| 8200270 | 2/1982 | WIPO . | |

OTHER PUBLICATIONS

*Integrated Microprocessor Control of a Hybrid I.C. Engine/Battery–Electric Automotive Power Train*, P. W. Masding et al., Trans. Inst. MC., vol. 12, No. 3, pp. 128–146, 1990.
*Engine Control Sensors for the '80's: A Preview*, Society of Automotive Engineers, Inc., pp. 28–30, 1980.

Primary Examiner—Brian L. Johnson
Attorney, Agent, or Firm—Watson, Cole, Grindle & Watson

[57] ABSTRACT

A propulsion system includes an internal combustion engine predominantly operating in a steady-state mode and a driving engine operating in a transient mode, which act on the output shaft of a planetary gear train by first and second drive shafts. To obtain independent speed and torque values at the driven shaft, an additional transiently operating engine is provided which has a fixed r.p.m. ratio with the first drive shaft or the driven shaft of the planetary gear train. The two transient engines are configured as hydraulic engines or electric engines connected to a control device, a unit being provided for hydraulic or electric power flow between the two transient engines, which in turn is provided with an energy storage.

9 Claims, 2 Drawing Sheets

HYBRID DRIVE SYSTEM

CROSS-REFERENCE TO RELATED APPLICATION

This application is a continuation of application Ser. No. 08/004,300, filed Jan. 14, 1993, now abandoned.

BACKGROUND OF THE INVENTION

The invention relates to a propulsion system with a predominantly steady-state internal combustion engine and a transiently operating engine, which act on the output shaft of a planetary gear train via a first and second drive shaft.

DESCRIPTION OF THE PRIOR ART

A propulsion system of the above type is known from DE-AS 23 53 724, which presents a hybrid drive with two motors acting on the output shaft by means of a torque division gear with respect to control characteristics, the predominantly steady-state engine, for example, an internal combustion engine, is more sluggish than the transiently operating engine, or rather, its speed and torque range subject to control is narrower than that of the transient engine, the steady-state engine essentially taking care of the constant base load of the propulsion system. Via its output shaft, which is supplied with energy delivered by a gyro storage, the steady-state engine drives the sun gear of a planetary gear train, whose fixed link, which is mounted on the output shaft, carries planetary gears engaged by a ring gear. Via a reducing gear and a coupling, the ring gear is connected with an electric motor running in transient mode, exchanging energy with an electric storage device.

In WO-A1 82/00270 a vehicle propulsion system is presented which consists of an engine, a flywheel, a continuously variable gear, an intermediate gear element, and a differential gear. The continuously variable gear comprises two hydrostatic units which are separately mounted in the propulsion unit, and which may be operated as pump and motor in turn, each having a shaft connecting to the gear, the two units being connected by hydraulic lines. The hydrostatic units thus are interdependent; if one unit is operated as a pump, the other one must be operated as a motor, and vice versa.

The hybrid drive disclosed in U.S. Pat. No. 3,923,115 is basically identical with the drive unit in DE-AS 23 53 724 cited above. It also comprises two driving engines, i.e., an internal combustion engine and an electric motor, one engine additionally charging a gyro storage device with energy via its output shaft. The gyro storage should not be interpreted as a transient engine in the sense of the present application, however, as it can only be used for feeding energy back into the propulsion system for short periods, which has been derived from preceding power peaks.

The propulsion system of U.S. Pat. No. 4,335,429, finally, has an internal combustion engine and two electric motors. In this case power transmission is not effected by a planetary gear, however, but by a simple clutch mechanism.

The disadvantage of these known propulsion systems is that they do non permit a variable, speed-independent torque to be supplied at the output end.

SUMMARY OF THE INVENTION

It is an object of the invention to develop a propulsion system of the above type in such a way as to permit continuous variation of the output speed, independent of the applied torque.

In the invention this object is achieved by providing an additional transiently operating engine which has a fixed r.p.m. ratio with the first drive shaft or the output shaft of the planetary gear train, and by configuring the two transient engines as hydraulic engines or electric engines connected to a control device, a unit being provided for a hydraulic or electric power flow between the two transient engines, which in turn is provided with an energy storage device. The two transient engines, which are mounted on two different shafts of the planetary gear, are operated in such a way as to ensure that the equilibrium of torque of the planetary gear is established in any operating point of the engine. The speeds of the two engines are adjusted in correspondence with the kinematic conditions of a planetary gear.

providing that every electric engine may be employed both as a generator and as an electric motor with the use of an energy storage device, or rather, that the sense of rotation may be reversed, a number of operational modes are made possible in the propulsion system of the invention, including both series and parallel hybrid operation as well as all intermediate variants. If hydraulic engines are used, a pump for a hydraulic medium is used as a generator and a hydromotor as a prime mover. Via pressure lines both, pump and motor are connected with a pressure storage unit as an energy storage.

In addition to the direct mechanical flow of power via the planetary gear train, there is an electric or hydraulic power flow between the two transiently operating engines, which passes through an electric energy storage (battery) or a pressure storage.

It is provided in an enhanced variant of the invention that the predominantly steady-state internal combustion engine operate in two operating points, i.e., a first and a second point, with different power outputs.

For better adjustment to different operational modes it is proposed in a further development of the invention that at least the steady-state engine be made separable from the planetary gear train by means of a coupling. In the same way the transient engines may be disconnected by couplings.

The invention further provides that at least one of the engines be connected with the planetary gear train via an additional gear.

To establish a fixed transmission ratio with a high degree of efficiency, it is proposed that couplings be provided for locking at least one drive shaft of the planetary gear train.

According to the invention another fixed transmission ratio with a high degree of efficiency is obtained with the use of a coupling by means of which the second drive shaft is connected to the output shaft of the planetary gear train.

In a preferred variant of the invention the predominantly steady-state internal combustion engine is connected via couplings to the sun gear, and the first transiently operating engine is connected via an additional gear to the ring gear of the planetary gear train, and, further, the second transiently operating engine acts on the shaft of the sun gear via an additional gear.

The propulsion system of the invention permits the development of a CVT (continuously variable transmission) planetary gear train, which is suitable for use in a hybrid vehicle, for example.

It is finally proposed by the invention that the control device for partly automatized operation of the propulsion system in a vehicle be provided with a microprocessor unit storing the characteristics of all elements of the propulsion system, which receives inputs from sensors registering the state of motion of the vehicle and the charge condition of the energy storage, and data from an input device for entering operational parameters from outside, for instance by telemetric processes or by the driver, and that the output of the microprocessor actuate elements for control of the engines and for activating the couplings. The input of operational parameters may be effected via radio signals or induction loops in the roadway, which are part of a traffic control system.

BRIEF DESCRIPTION OF THE DRAWINGS

The invention will be further described with reference to the accompanying schematical drawings, in which.

DETAILED DESCRIPTION OF PREFERRED EMBODIMENTS

Figure 1:
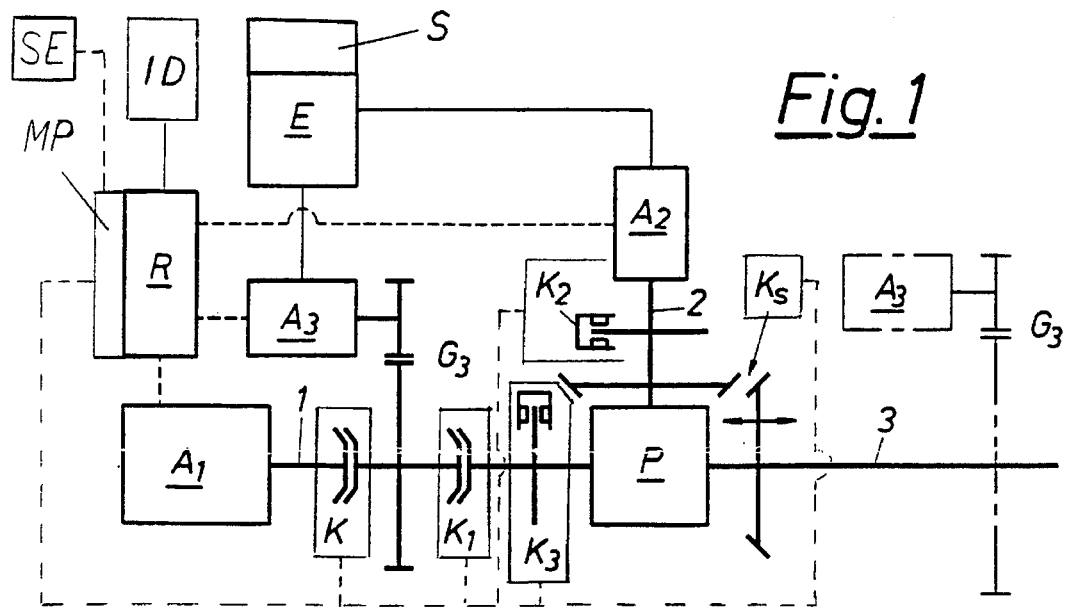
FIG. 1 is a propulsion system of the invention.

The propulsion system shown in FIG. 1 has a planetary gear train P with a first drive shaft 1 and a second drive shaft 2. The drive shaft 1 is connected to a predominantly steady-state internal combustion engine A1 and the drive shaft 2 to a transiently operating driving engine A2. An additional transiently operating engine A3 may have a fixed r.p.m. ratio either with the drive shaft 1 or the output shaft 3 (shown as a dash-dotted line) of the planetary gear train P. The engine As may be mounted on the respective shaft itself, or it may be connected to it via a gear G3. The control device R comprises a microprocessor system MP which, via sensor devices SE, collects data on the state of motion of a vehicle and the charge condition of an energy storage S. The microprocessor is connected to actuating elements for the engines A1 to A3 and the couplings be described below. In addition, a unit E is provided for electric or hydraulic power flow between the engines A2 and A3 configured as electric or hydraulic engines, such that an energy exchange will be possible between the two motors, the energy storage S (battery or pressure storage, e.g., compressed-air) being inserted for this purpose.

With the use of coupling K the internal combustion engine A1 may be decoupled from the planetary gear. By disengaging coupling K1 the entire drive unit consisting of A1 and A3 is disconnected.

Couplings K2 and K3 will lock the drive shafts 2 and 1, coupling Ks connects the drive shaft 2 with the output shaft 3 of the planetary gear train P.

In the other variants the same reference numbers are used. i.e., 1 and 2 for the drive shafts and 3 for the outpost shaft; it should be noted that the individual shafts of the gear are cyclically exchangeable.

Figure 2:
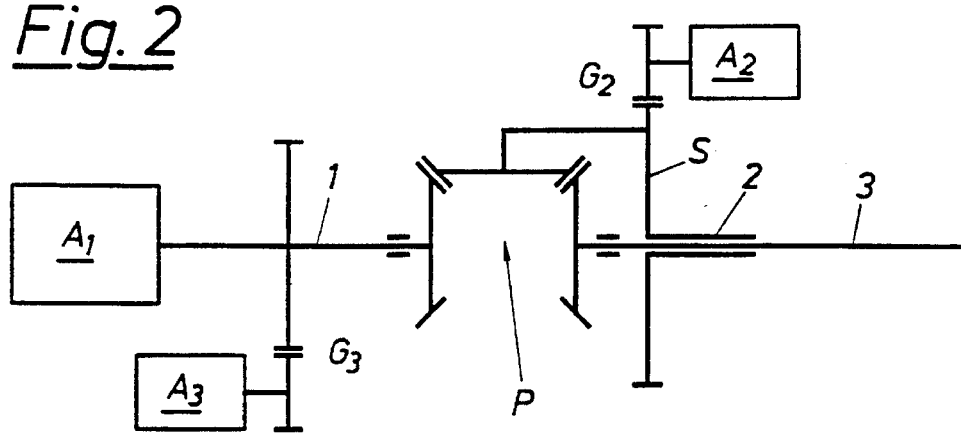
FIGS. 2 to 5 are variants of the system of FIG. 1.
Figure 3:
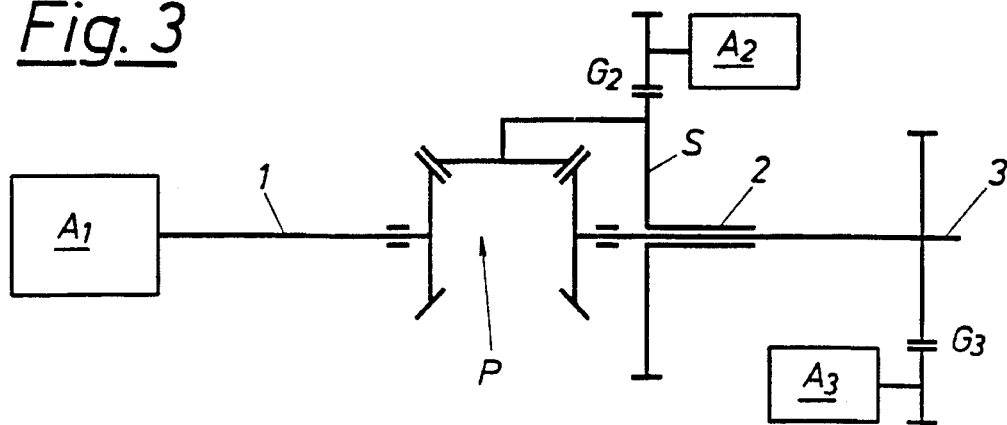

In FIGS. 2 and 3 the planetary gear train P is configured as a differential gear, the engine A2 acting on the drive shaft 2 of the idler gear S via a G2. FIGS 2 and 3 differ by the different position of engine As, which is connected to the drive shaft 1 in FIG. 2, and to the output shaft 3 in FIG. 3.

Figure 4:
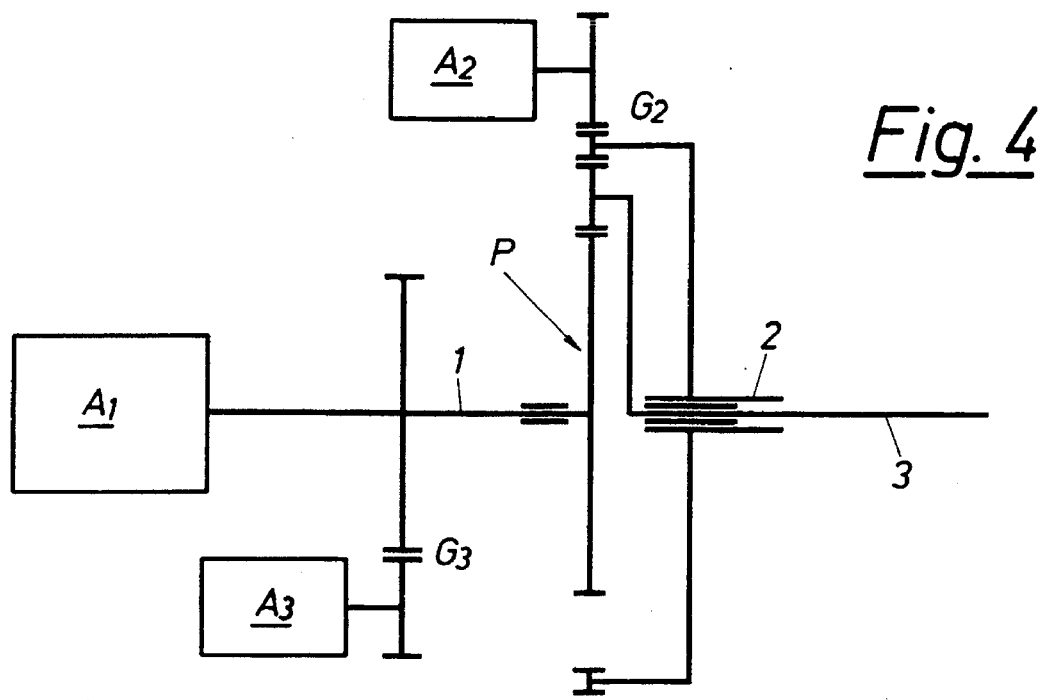
Figure 5:
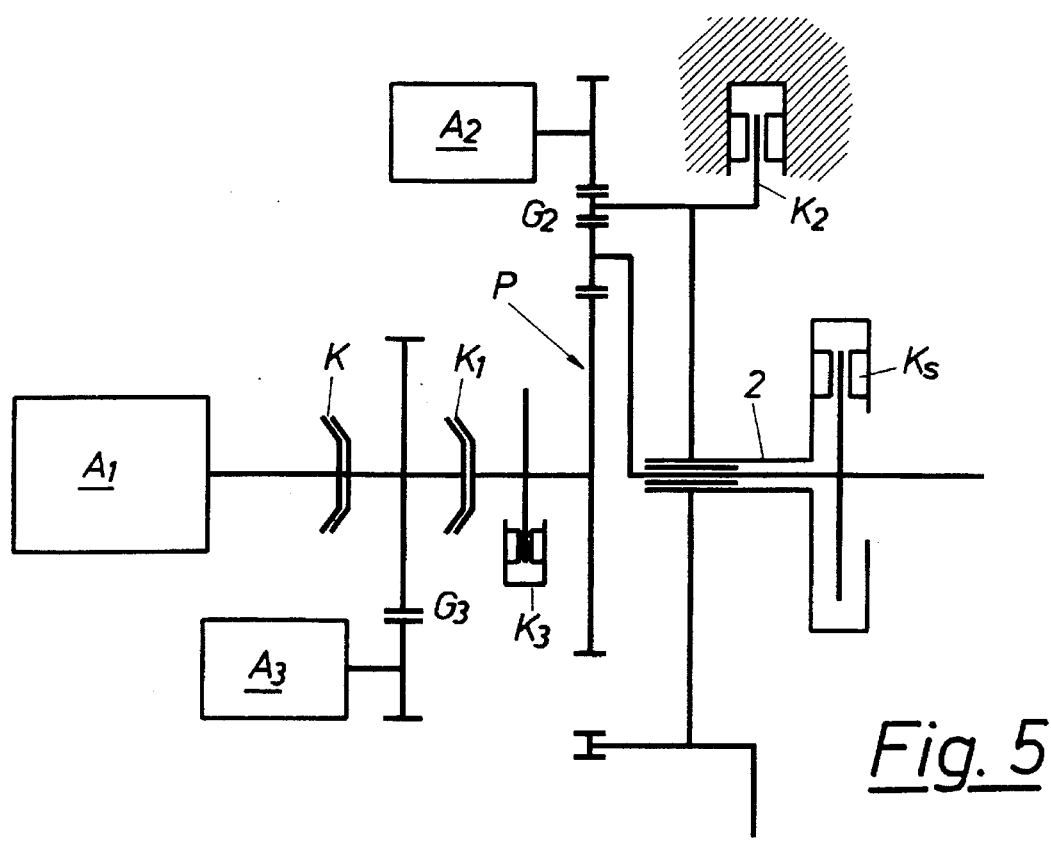

In the variants of FIGS. 4 and 5 the predominantly steady-state internal combustion engine A1 is connected to the sun gear of a planetary gear train P, the shaft 1 off the sun gear also being acted upon by the transient engine A3. The transient engine A2 is connected to the ring gear of the planetary gear train P by an additional gear G2, the idler shaft serving as an output shaft 3. To obtain fixed r.p.m. ratios, couplings K2 and Ks are provided; as before, coupling K2 may be used for locking the drive shaft 2 of the planetary gear train, and coupling Ks for connecting the drive shaft 2 with the driven shaft 3. By activating both couplings K2 and Ks at the same time, the output shaft 3 may be arrested.

By opening coupling K1 and closing coupling K the engines A1 and A3 may be separated from the gear, thus interrupting the mechanical power flow. Via the unit for an electric or hydraulic power flow including an energy storage (cf. FIG. 1; not shown in FIGS. 2 to 5) power transmission to the engine A2 and the driven shaft 3 may be accomplished in all variants.

The couplings K, K1, K2, K3, and Ks shown in FIGS. 1 and 5 may be used in the same way in all other variants.

The individual states of couplings K1, K2, Ks, and K permit sixteen possible operational modes (mode 1 to 16) of the propulsion system. In Table 1 open couplings are marked with a -, and closed couplings with an x. For the transmission ratio i the neutral transmission io is used as a reference.

TABLE 1

| MODE | $K_1$ | $K_2$ | $K_s$ | K | REMARK |
|---|---|---|---|---|---|
| 1 | x | x | x | x | parking brake |
| 2 | x | x | x | — | parking brake; $A_1$ permitted to run (e.g., for maintenance work on $A_1$) |
| 3 | x | x | — | x | fixed transmission ratio for $A_1$ and $A_3$; $i = 1 - i_o$; power outputs added (e.g., for overtaking) |
| 4 | x | — | x | x | rigid shaft connection; $i = 1$; $A_1$, $A_3$ and $A_2$ may run simultaneously |
| 5 | — | x | x | x | parking brake (e.g., battery recharge with the vehicle at standstill) |
| 6 | x | x | — | — | $A_1$ disconnected; purely electrical operation by means of $A_3$; $A_2$ at standstill; $i = 1 - i_o$ |
| 7 | x | — | — | x | all engines ready; torque and speed continuously variable via $A_3$ and $A_2$ (e.g., cruising speed) |
| 8 | — | — | x | x | serial hybrid operation, el. drive via $A_2$; $i = 1$; recharging of energy storage by $A_1$ and $A_3$ |
| 9 | — | x | x | — | parking brake, no charging function; test $A_2$ (idling possible); test $A_3$ possible |
| 10 | — | x | — | x | charging only; no parking brake |
| 11 | x | — | x | — | purely electrical operation; $i = 1$; $A_3$ and $A_2$ in operation (electrical power outputs summed) |
| 12 | x | — | — | — | CVT operation without $A_1$ |
| 13 | — | x | — | — | coasting (towing); no propulsion possible |
| 14 | — | — | x | — | $A_2$ operation possible; $i = 1$ |
| 15 | — | — | — | x | charging possible without parking brake |
| 16 | — | — | — | — | all engines may be tested individually |

Out of the possible operational modes of the propulsion system four modes and their subvariants should be specially mentioned, in which the state of coupling K3 if or locking the drive shaft 1) also is indicated. These modes are;

1. Steady-state operation of engine A1 (internal combustion engine)

1.1 Parallel hybrid operation

Couplings K, K1 closed, coupling Ks open.

Couplings K2, Ks closed or open, depending on desired output speed. When coupling K2 is closed engine A2 is switched off.

Control of output speed using engine A2.

Control of output torque using engine A3.

The internal combustion engine A1 may be operated in a first operating point (full power), or in a second operating point (reduced power), depending on power requirements.

The sense of rotation of engine A2 is reversible.

Engines A2 and As may be operated both as a motor (hydromotor) and as a generator (pump), depending on the transmission ratio.

If large transmissions (low output speeds) are used in parallel hybrid operation, large powers must flow from engine A3 to engine A2, between which an energy storage S is inserted.

1.2 Serial hybrid operation

Coupling K1 open, coupling K closed, one of couplings Ks, K3 closed.

Engines A1 and A3 operate as a motor/generator unit, propulsion is entirely accomplished by engine A2.

If coupling Ks is closed there is a rigid connection between A2 and the output shaft.

If coupling K3 is closed the drive shaft 1 is locked. This will give another fixed transmission ratio, thus reducing the torques to be supplied by A2.

For a low output speed at high torque (hill climbing) serial hybrid operation is preferable to parallel hybrid operation.

2. Electro-operation 2.1 Propulsion accomplished by engine A3

Couplings K and K3 open, coupling K1 closed.

Couplings K2, Ks open or closed, depending on desired output speed.

Propulsion entirely accomplished by engine A3, engine A2 switched off in this mode.

2.2 Propulsion accomplished by engine A2

Coupling K1 open. p1 Operation of the electric (hydraulic) part of propulsion system is identical with serial hybrid operation. See remarks item 1.2.

3. Purely mechanical operation

Purely mechanical operation requires engine A1 to work in transient mode.

Couplings K, K1 closed.

Via couplings K2, Ks two transmission ratios may be selected, the planetary CVT gear operates as a two-speed gear train. Engines A2 and As are switched off and disconnected, if necessary.

This mode may be employed in the high-speed range (cruising). It is also useful for emergency service, when the energy storage is completely drained.

4. Parking brake

When couplinges K2 and Ks (s are closed at the same time, the drive unit is blocked, putting the vehicle into parking mode.

With the above operational modes of the propulsion system of the invention (see Table I), different hybrid drive structures are obtained by a simple switching of coupling positions. The advantage of such "variable structures" is that they permit activation of the structure best suited to a particular situation, depending on a large number of parameters. In a vehicle equipped with this system of propulsion, a microprocessor unit will decide which structure or operational mode is best suited for the respective state of motion of the vehicle. The decision criteria may be of a technical nature, such as maximum efficiency, or lowest emission, or they may have a legal background, for instance, if the use of an internal combustion engine emitting pollutants is forbidden by law at certain times or in certain zones. For decision-making the microcomputer will process information on the state of motion of the vehicle and the parameters entered telemetrically or by the driver i.e., via input device ID (see FIG.1), following which a decision will be reached as to the structure to be selected, and, consequently, the type of energy to be used. This process of decision-making involves the use of programmed characteristics of the propulsion system, efficiencies of individual components depending on the first or second operating point, and information on the charge condition of the respective energy storage. In this way the energy management in the propulsion system is performed by the microprocessor.

As a further advantage the energy storage S can be recharged from outside, no matter whether a battery or a pressure storage is used.

Finally, the propulsion system is made more economical by using a combustion engine with two operating points, which will permit operation of the engine in its second state, for instance, if the energy storage is full, so that the energy surplus in the storage may be consumed.

We claim:

1. A hybrid drive system which comprises:

a planetary gear train having an output shaft, a primary internal combustion engine capable of steady-state operation, a primary drive shaft operatively connected between said primary internal combustion engine and said planetary gear train to rotate said output shaft, a first auxiliary engine capable of transient operation, a first auxiliary drive shaft operatively connected between said first auxiliary engine and said planetary gear train to rotate said output shaft, a second auxiliary engine capable of transient operation at a fixed rpm ratio relative to an rpm of one of said primary drive shaft and said output shaft, a second auxiliary drive shaft operatively connected between said second auxiliary engine and one of said primary drive shaft and said output shaft to rotate said output shaft, a first control means connected to said primary internal combustion engine and each of said first and second auxiliary engines to control operation thereof, and a second control means connected between said first and second auxiliary engines to control power flow therebetween, said second control means including an energy storage means.

2. A hybrid drive system according to claim 1, wherein said first and second auxiliary engines are electric engines and said energy storage means of said second control means is a battery.

3. A hybrid drive system according to claim 1, wherein said first and second auxiliary engines are hydraulic engines and said energy storage means of said second control means is a hydraulic storage means.

4. A hybrid drive system according to claim 1, including couplings between said planetary gear train and each of said primary internal combustion engine, said first auxiliary engine and said second auxiliary engine.

5. A hybrid drive system according to claim 1, including an additional gear connecting at least one of said first and second auxilliary engines with said planetary gear train.

6. A hybrid system according to claim 1, including couplings interconnected with said first and second auxiliary drive shafts for locking at least one of said first and second auxilliary drive shafts.

7. A hybrid system according to claim 1, including a coupling for connecting said second auxilliary shaft to said output shaft of said planetary gear train.

8. A hybrid drive system according to claim 1, with said planetary gear train comprising a sun gear connected to said primary drive shaft and a ring gear, wherein said primary internal combustion engine is connected via couplings to said sun gear, and said first auxilliary engine is connected via a first additional gear to said ring gear of said planetary gear train, and wherein said second auxilliary, engine acts on said primary drive shaft via a second additional gear.

9. A hybrid drive system according to claim 1, wherein said first control means is for partly automated operation of said hybrid drive system in a vehicle and includes a microprocessor unit storing characteristics of all elements of said hybrid drive system, sensor means connected to said microprocessor for registering a state of motion of said vehicle and charge conditions of said energy storage device, and an input means connected to said microprocessor for entering operational parameters from outside, said microprocessor unit being connected to control said primary internal combustion engine, said first and second auxiliar engines, and all couplings of said hybrid drive system.

* * * * *

UNITED STATES PATENT AND TRADEMARK OFFICE
CERTIFICATE OF CORRECTION

PATENT NO. : 5,492,189
DATED : February 20, 1996
INVENTOR(S) : Kriegler et al.

It is certified that error appears in the above-indentified patent and that said Letters Patent is hereby corrected as shown below:

On the title page item:

[30] Foreign Application Priority Data
    Jan. 16, 1992 [AT] Austria ..............A61/92

Signed and Sealed this

Thirtieth Day of April, 1996

Attest:

BRUCE LEHMAN

Attesting Officer     Commissioner of Patents and Trademarks